United States Patent [19]

Wingert et al.

[11] 4,427,625

[45] Jan. 24, 1984

[54] SILVER CADMIUM OXIDE ELECTRICAL CONTACTS

[75] Inventors: Philip Wingert, Greensburg; Larry J. Gaudino, Latrobe; Han J. Kim, Greensburg, all of Pa.

[73] Assignee: GTE Products Corporation, Stamford, Conn.

[21] Appl. No.: 311,363

[22] Filed: Oct. 15, 1981

[51] Int. Cl.³ .............................................. F16H 13/02

[52] U.S. Cl. ....................................... 419/21; 419/22; 419/35

[58] Field of Search ................. 75/206, 232, 234, 247; 428/570; 420/504; 419/21, 22, 35

[56] References Cited

U.S. PATENT DOCUMENTS

| | | | |
|---|---|---|---|
| 4,217,139 | 8/1980 | Kim et al. | 75/206 |
| 4,294,616 | 10/1981 | Kim et al. | 75/206 |
| 4,323,395 | 4/1982 | Li | 75/212 |

OTHER PUBLICATIONS

Goetzel; C. G., *Treatise on Powder Metallurgy;* 1949; pp. 248–250.

*Primary Examiner*—Brooks H. Hunt
*Assistant Examiner*—Joel P. Okamoto
*Attorney, Agent, or Firm*—Donald R. Castle

[57] ABSTRACT

Addition of copper to silver-cadmium oxide by adding copper to submicron silver powder improves the morphology of the cadmium oxide in the sintered material and enables sintered densities greater than 96% of theoretical to be achieved.

1 Claim, 2 Drawing Figures

SILVER CADMIUM OXIDE ELECTRICAL CONTACTS

FIELD OF THE INVENTION

This invention relates to silver cadmium oxide electrical contacts. More particularly it relates to silver cadmium oxide electrical contact materials containing minor amounts of copper which improves the cadmium oxide morphology and increases the sintered density.

BACKGROUND OF THE INVENTION

The goal in the production of silver-cadmium oxide electrical contacts is to create a fully dense material having a homogenous distribution of rounded cadmium oxide particles tightly embedded in the silver matrix. Methods of attaining such an ideal structure have been sought, but no process has as yet achieved this ideal condition.

Three methods are currently used commercially to produce silver cadmium oxide electrical contacts. The simplest and least costly process is the conventional powder metallurgy method wherein fine powders of silver and cadmium oxide are blended together to form a uniform admixture. The powders after blending are compacted under pressure to achieve a green unsintered contact. The contact is sintered at a temperature below the melting point of silver and thereafter coined to achieve near theoretical density. The degree of dispersion of the cadmium oxide in the silver matrix is primarily dependent upon the mixing achieved. While this method is relatively simple, uniform and small cadmium oxide particles are not attained. The particles of cadmium oxide are irregularly shaped and have a relatively wide particle size range. For example, the range is generally from 1 to 5 microns when the average is 2 microns.

Another process involves starting with silver and cadmium metals, forming finely divided powders of these two metals then oxidizing the cadmium oxide. U.S. Pat. No. 3,954,459 gives a description of such a process. In the process of that patent a fraction of the total powders in the 0.2 mm to 1 mm diameter range is separated and oxidized at temperatures of about 800° C. The oxidized powder is further comminuted to produce fragments having a particle size range in the 200 to 300 micron range. The comminuted particles are compacted using pressures of from about 900 $K/cm^2$ to about 720 $K/cm^2$. Zinc stearate or stearic acid is used as a molding aid and sintering is done in air at about 800° C. for about 1 hour. To achieve a pore-free contact post-sintering compaction is also done, preferably by hot-pressing at a pressure of about 7200 $K/cm^2$ and at a temperature of about 650° C. While the foregoing process produces a more uniform distribution of cadmium oxide than is achieved by blending silver and cadmium oxide as previously described, migration of cadmium during oxidation leads to localized areas which are cadmium oxide-rich. There is no direct control over the particle size of cadmium oxide thus the particle size of cadmium oxide in the contact varies over a relatively large range.

A third more recent process is to uniformly blend finely divided silver and finely divided cadmium oxide, reduce the cadmium oxide at a temperature above the melting point of cadmium (above 321° C.), oxidize the alloy powder, and thereafter compact and sinter the contact as in the other processes. Distribution of cadmium oxide is improved over the other two previously described processes. However, the densities of the compacts after sintering are seldom above about 93% of the theorectical density. In addition, the cadmium oxide particles range from less than 1 micron to larger than 5 microns and are not spherical in shape.

It is believed, therefore, that the production of silver cadmium oxide compacts that after sintering have a density of greater than 96% of the theoretical density and contain a very homogenous distribution of rounded cadmium oxide particles with a large percentage in the 3 to 5 micron range would be an advancement in the art.

SUMMARY OF THE INVENTION

In accordance with one aspect of the invention there is provided a silver cadmium oxide material having a density greater than 96% of its theoretical density consisting essentially of from about 5 to about 25% by weight of cadmium oxide, from about 100 to about 1000 parts per million of copper, balance silver as a matrix. The cadmium oxide particles are relatively homogeneously distributed throughout the silver matrix. The cadmium oxide particles are predominantly in the 3 to 5 micron particle size range.

In accordance with another aspect of this invention there is provided a process comprising doping a submicron silver powder with a predetermined minor amount of copper, relatively uniformly distributed on the surface of said silver powder, thereafter blending finely divided cadmium oxide with the doped silver powder in a predetermined ratio to form a relatively uniform admixture, reducing the cadmium oxide in said admixture to cadmium at a temperature above 321° C. until all of said cadmium oxide is reduced and a uniform silver cadmium alloy powder is formed, oxidizing the alloy powder to form a silver cadmium oxide mixture and sintering the powder to a density of greater than about 96% of theoretical.

Figure 1:
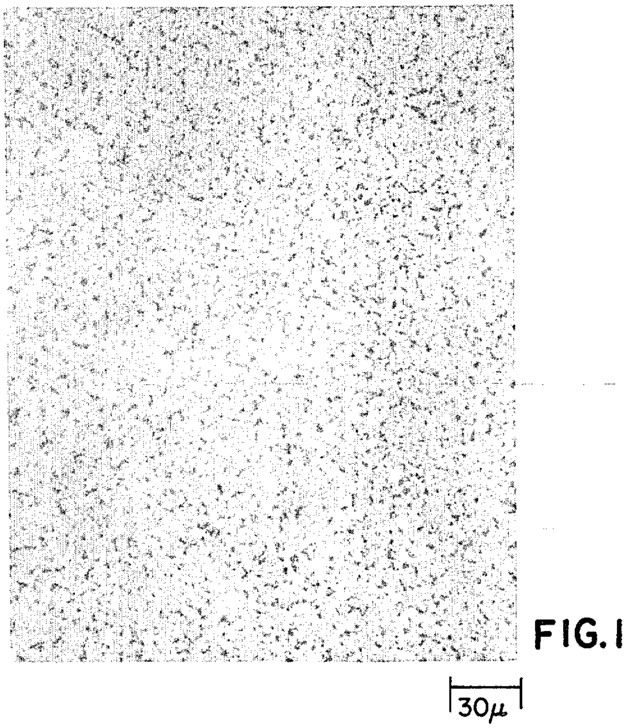
FIG. 1 is a photomicrograph of a cross-section of the AgCdO+copper electrical contacts of this invention.

For a better understanding of the present invention, together with other and further objects, advantages and capabilities thereof, reference is made to the following disclosure and appended claims in connection with the above-described drawings.

DETAILED DESCRIPTION OF THE PREFERRED EMBODIMENTS

In the practice of this invention submicron silver powder is doped with from about 100 to about 1000 parts per million of copper distributed uniformly upon the surface of the silver. While any appropriate method which achieves the uniform distribution with the desired amount of copper can be used, it is preferred to use an alcohol solution of an alcohol soluble copper salt such as copper nitrate, copper acetate, copper hydroxide and the like. By "alcohol-soluble" within this specification it is meant that there is a solubility of at least 2 grams of the salt in 100 grams of ethyl alcohol.

After the copper-doped silver powder is prepared it is dried to remove any residual alcohol by heating above the boiling point of the particular alcohol used. Thereafter the copper-doped silver powder is blended with the desired amount of cadmium oxide having an average particle size of about 2 microns. In the manufacture of electrical contacts from about 5% to about 25% by weight of cadmium oxide is used. The blend of copper-doped silver powder is then placed in an appropriate container and heated to above 321° C. in a reducing atmosphere. Generally temperatures of from about 340° C. to about 550° C. are used. An appropriate reducing atmosphere contains about 75% hydrogen, balance nitrogen. Other reducing atmospheres can be used as would be apparent to those skilled in the art. The cadmium oxide is reduced to cadmium metal which, at the temperature employed, is in the liquid state. If a copper salt is used as the copper source it is also reduced to a copper metal. After reduction a silver-cadmium alloy powder containing the copper is produced. This powder is then oxidized at about the same temperature as is used during reduction. A preferred method is to hold the same approximate temperature, for example within 321° C. to 550° C., that is used during reduction as is described in U.S. Pat. No. 4,217,139 which is incorporated by reference herein. The effect of the copper addition is to modify the size, shape and location of the cadmium oxide particles and to increase the sintered density of the powder. There are more large (3 to 5 micron) cadmium oxide particles, fewer fine ($\leqq 1$ micron) particles, and no excessively large ($>10$ micron) and possibly porous cadmium oxide particles or agglomerates in the sintered material. The absence of excessively large cadmium oxide is believed to be due to promotion of wetting of the silver by molten cadmium due to the copper. Promoted wetting reduces the chance of molten cadmium agglomerating itself rather than wetting the silver and diffusing to form a homogeneous alloy powder. The modified morphology of the bulk ($\leqq 5$ microns in size) of the cadmium oxide could be caused by changes in the number and location of cadmium oxide particles after reduction and oxidation, changing of the silver-cadmium oxide interfacial energy, or changes in the diffusion rates or solubility of migrating species in silver. The change in cadmium oxide morphology due to the addition of copper allows the powder to be sintered to higher densities and in this way improves the physical durability of the resulting contact material.

To more fully illustrate the preferred embodiments of the subject invention the following examples are presented. All parts, percentages and proportions are by weight unless otherwise indicated.

EXAMPLE 1

About 835 parts of silver powder having submicron particle size is doped with about 0.334 parts of copper in an alcohol solution added so as to thoroughly wet the surface of the silver powder. The powder is dried at about 80° C. and mixed with about 165 parts of cadmium oxide powder having an average particle size of about 2 microns to form a relatively uniform blend. The blend is then reduced at a temperature of about 350° C. using an atmosphere containing about 75% by volume of hydrogen and the balance nitrogen. The cadmium oxide is reduced to cadmium and the copper nitrate to copper. The alloy powder is allowed to homogenize for 1 hour at temperature. The cadmium in the mixture is then oxidized at about 350° C. using air as the oxidizing atmosphere. Complete oxidation occurs within about 1 hour. The material is compacted using a compaction pressure of about $2.8\times10^3$ Kg/cm$^2$. The compact is then sintered at a temperature of about 915° C. for about 1½ hours. The density of the composition is about 9.7 grams/cc or about 96.8% of the theoretical density. FIG. 1 is a photomicrograph at 405× magnification of a cross-section of a contact produced by this example.

EXAMPLE 2

Figure 2:
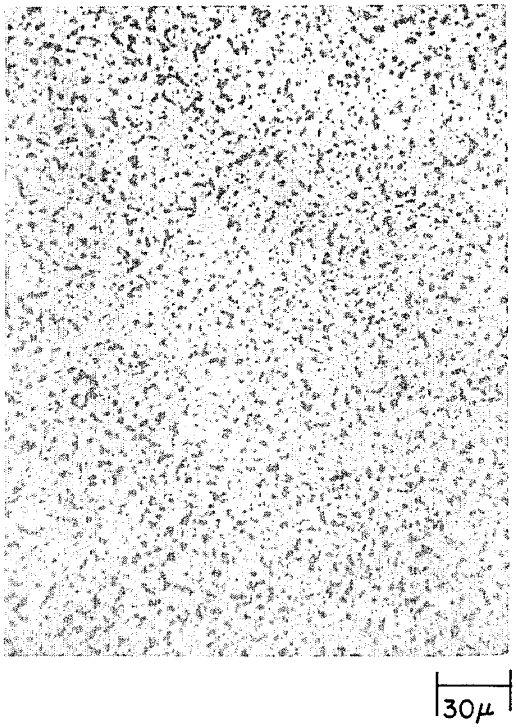
FIG. 2 is a photomicrograph of a cross-section of a AgCdO electrical contact produced in a similar manner as the contact of FIG. 1 without copper.

The procedure of Example 1 is followed using essentially the same silver and cadmium oxide powders, with the exception that no copper-doping treatment is employed. The sintered contact has a density of about 9.25 g/cc which is a theorectical density of about 92.3%. FIG. 2 is a photomicrograph at 405× magnification of a cross-section of the contact produced by this Example.

It is believed apparent from FIG. 1 and FIG. 2 that the material in FIG. 1 has more spherical cadmium oxide partially (the darker portions) than those in FIG. 2. It is also apparent that the cadmium oxide particles in FIG. 1 are larger than those in FIG. 2.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for the production of silver-cadmium oxide electrical contact material comprising (a) adding a sufficient amount of copper to submicron silver powder to achieve from about 100 parts to about 1000 parts per million of copper in contact material, said copper being relatively uniformly distributed on the surfaces of said silver powder, (b) blending a sufficient amount of cadmium oxide particles to said silver-copper powder to form a relatively uniform admixture to achieve a cadmium oxide concentration of from about 5% to about 25% by weight, (c) reducing said cadmium oxide in said admixture to cadmium at a temperature of from about 321° C. to about 550° C., (d) oxidizing the resulting silver-copper-cadmium material for a sufficient time to oxidize all of said cadmium to substantially spherical cadmium oxide particles and (e) sintering the resulting mixture to achieve a silver-cadmium oxide compact having a density greater than about 96% of theoretical.

* * * * *